United States Patent [19]
Griffis

[11] 3,730,591
[45] May 1, 1973

[54] TRUCK OR TRAILER WITH LATERALLY TILTABLE DUMP BODY WITH HINGED SIDE PANELS HYDRAULICALLY OPERATED FROM CLOSED TO OPEN POSITION

[75] Inventor: Juniper Griffis, Bowie, Tex.

[73] Assignee: Harold E. Lyst, Bowie, Tex., a part interest

[22] Filed: Aug. 24, 1971

[21] Appl. No.: 174,372

[52] U.S. Cl. ............... 298/17.6, 105/273, 105/276, 298/23 MD, 298/23 DF
[51] Int. Cl. .............................................. B60p 1/28
[58] Field of Search ................ 298/17.6, 17.7, 18, 298/35 M, 23 MD, 23 DF, 7; 105/270, 271, 273, 276, 240

[56] References Cited

UNITED STATES PATENTS

| | | | |
|---|---|---|---|
| 953,865 | 4/1910 | Sites | 298/17.6 |
| 2,027,989 | 1/1936 | Linn | 298/17.6 |
| 2,943,886 | 7/1960 | Wilkinson | 298/35 M |
| 3,326,605 | 6/1967 | Steingas | 298/17.7 |
| 3,356,416 | 12/1967 | Kress | 298/35 M |
| 1,620,759 | 3/1927 | Hamel | 105/271 |
| 1,909,341 | 5/1933 | Galanot | 298/22 P |
| 3,053,574 | 9/1962 | Peterson | 298/23 DF |

Primary Examiner—Richard J. Johnson
Assistant Examiner—Reinhard Eisenzopf
Attorney—William R. Piper

[57] ABSTRACT

A truck or trailer with hydraulically actuated and laterally tiltable dump body with hinged side panels hydraulically swingable into open and closed position and having the hydraulic controls in the cab of the truck. Novel manually controlled locking means is used for securing the side panels from accidentally swinging laterally into open position. The hydraulically actuated means for tilting the body laterally in either direction from a horizontal position can incline the body at an angle of substantially 45° and the side panels can be swung into a position substantially paralleling the floor of the body.

4 Claims, 20 Drawing Figures

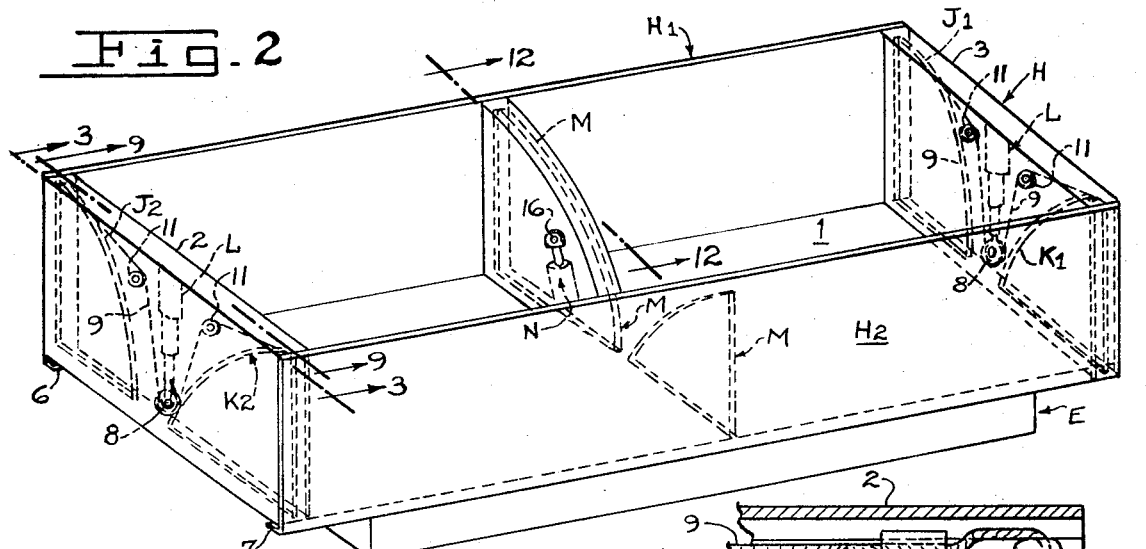
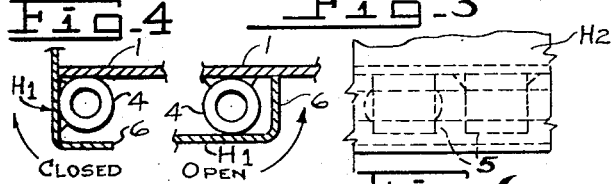
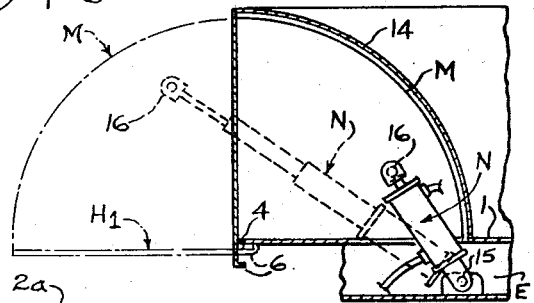
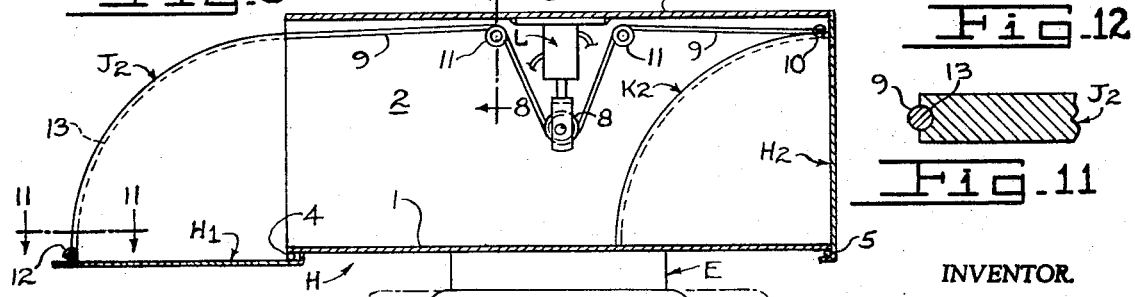

INVENTOR.
JUNIPER GRIFFIS
BY William R. Piper
ATTORNEY

TRUCK OR TRAILER WITH LATERALLY TILTABLE DUMP BODY WITH HINGED SIDE PANELS HYDRAULICALLY OPERATED FROM CLOSED TO OPEN POSITION

BACKGROUND OF THE INVENTION

Field of the Invention

The standard dump truck supports a load-carrying body that is hydraulically lifted in the direction of its length so that the load will be expelled at the rear of the truck. The disadvantage of such a dump truck is that the truck generally has to back up in order to discharge its load and from a safety point of view this can be dangerous. Also, in certain cases this type of unloading can be time consuming because it may take from 5 to 10 minutes for the operator to back the truck into the dumping area. Further, in regard to the safety factor, sometimes a rear tiltable truck body will cause the truck to completely turn over rearwardly due to lack of control because of the misplaced center of gravity. After the dumping operation, it is necessary to turn the truck around and with my improved side load dumping, this turning around of the truck is not necessary.

SUMMARY OF THE INVENTION

An object of my invention is to provide a truck or trailer laterally tiltable dump body with hinged side panels that are hydraulically operated from closed position into a position where the open panel lies in substantially the same plane as the bottom of the body when in its tilted position. The lateral tilting of the body from a horizontal position and in either direction is accomplished hydraulically and the tilting is not carried beyond a 45° angle. The hydraulic lateral tilting of the body cannot be accomplished until a novel locking mechanism is manually actuated so as to unlock either one or both side panels so that they can swing outwardly.

My improved laterally tiltable dump body may be mounted on a truck or on a trailer. In the latter case, the trailer would have a fifth wheel pivoted connection with a truck. The instrument panel on the truck would carry the control knob for actuating the hydraulic means to accomplish the lateral tilting of the dump body in either direction and would also carry the control knob for actuating the hydraulic means to accomplish the lateral tilting of either one or both of the hinged side panels. The side panel locking means prevents the accidental swinging of the side panels into open position.

BRIEF DESCRIPTION OF THE DRAWINGS

FIG. 2 is an oblique view of the dump body and supporting frame and illustrates the hinged side panels or gates for the body and the hydraulic means for operating them.

FIG. 3 is an enlarged rear end view of the dump body and illustrates the hydraulic mechanism for controlling the lateral swinging of the side gates or panels that are hingedly secured to the body.

FIG. 4 is an enlarged sectional detail showing the hinge connection between the dump body and one of the side gates. The circled portion 4 in FIG. 3 indicates the portion of the device that is shown on a larger scale. The side gate is in closed position in FIG. 4.

FIG. 5 is a section view similar to FIG. 4, but shows the side gate in open position.

FIG. 6 is a side elevation of a portion of the dump body to illustrate the hinged connection of the side gate to the body. The arrows 6—6 in FIG. 3 indicate that portion of the dump body where the view was taken.

FIG. 7 is an enlarged horizontal section taken along the line 7—7 of FIG. 3 and shows how the end of the cable is connected to an end quadrant-shaped support plate that is rigidly connected to its associated side gate, the cable being actuated by hydraulic means.

FIG. 8 is an enlarged transverse section taken along the line 8—8 of FIG. 9 and shows an idler pulley for guiding the cable that controls the operation of the side gates for the dump body.

FIG. 9 is a transverse section taken along the line 9—9 of FIG. 2 and illustrates one of the side gates in open position.

FIG. 11 is an enlarged section through one of the end quadrants for a side gate and is taken along the line 11—11 of FIG. 9. The periphery of the arcuate portion of the quadrant is shown provided with a cable receiving groove.

FIG. 12 is a transverse section along the line 12—12 of FIG. 2 and shows one of the center quadrants that is connected to the center portion of its associate side gate. This center quadrant is actuated by a telescopic hydraulic cylinder.

DESCRIPTION OF THE PREFERRED EMBODIMENT

Figure 1:
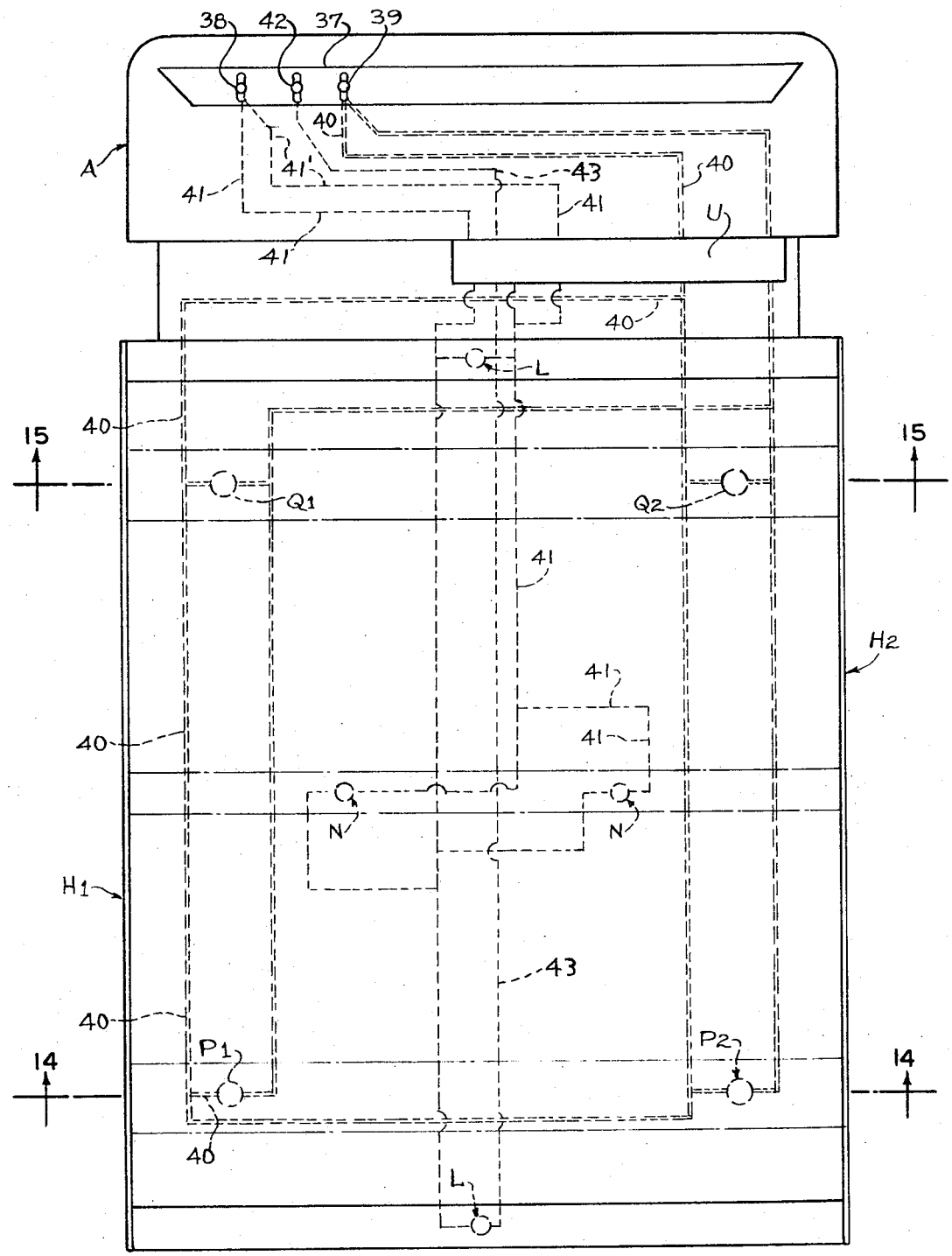
FIG. 1 is a schematic top plan view of a truck with a dump body and illustrates the various hydraulic lines that lead to the hydraulic means for laterally tilting the dump body in either direction and for actuating either one of the hinged side panels or gates.
Figure 13:
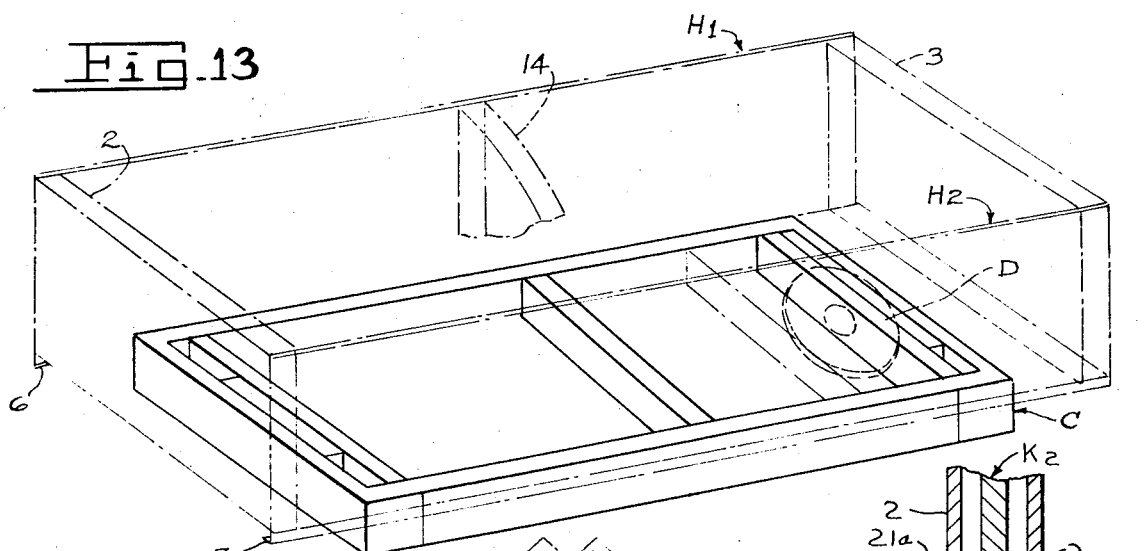
FIG. 13 is an isometric view of the intermediate frame that supports the dump body which is shown by dot dash lines in this Figure. Only portions of the dump body are illustrated.
Figure 10:
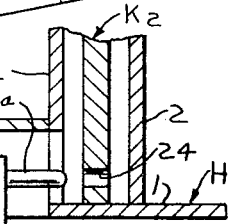
FIG. 10 is a sectional enlargement of one of the fingers with its locking pin as shown in FIG. 17. The housing for the finger and locking pin is also shown in section.

In carrying out my invention, I make use of a standard truck, indicated schematically at A, in FIG. 1, and the type of truck shown has the cab over the engine. Any type of truck may be used. The truck A may be removably connected to a trailer, indicated generally at B, in FIGS. 14 and 15, of any standard type. The trailer B includes a main frame C with a fifth wheel D, see the elliptic dash lines in FIG. 13, and also includes an intermediate frame E that is tiltable laterally by a rear bolster, shown at F, in FIG. 14, and by a front bolster G, shown in FIG. 15.

Before describing the structure of the rear and front bolsters and their hydraulic operating mechanisms, it is best first to set forth the structure of the dump body H, that is supported by the intermediate frame E, see FIG. 2. The dump body H has a bottom 1, a rear end 2 and a front end 3. Side panels or gates H1 and H2 for the dump body H are hingedly secured to the side edges of the dump body bottom by hinges 4 and 5, respectively, see FIG. 3. The lower edges of the side gates H1 and H2 are bent inwardly to form flanges 6 and 7, respectively. FIGS. 4 and 5 show an enlargement of the hinge 4 and the flange 6 for the side gate H1. When the gate H1 is swung into its open position so as to substantially parallel the plane of the dump body bottom, see FIG. 9, the flange 6 will have its edge abutting the undersurface of the bottom 1 so as to aid in supporting the side panel H1 in its extended position. FIG. 6 illustrates how the hinge 5 is connected to the dump body bottom 1 and to the side gate H2.

Quadrant-shaped front and rear end plates J1 and J2, see FIG. 2, have one of their straight edges welded or otherwise secured to the ends of the side gate H1. These end plates are swingably receivable in the hollow portions provided in the end walls 2 and 3 of the dump body. In like manner quadrant-shaped front and rear end plates K1 and K2 have their straight edges welded to the ends of the other side gate H2, and these end plates are swingably receivable in the same hollow portions provided in the dump body end walls 2 and 3. FIGS. 2 and 3 show the quadrant-shaped plates J2 and K2 by dotted lines and these two Figures plus FIGS. 7 and 9, illustrate the hydraulic mechanism for retracting the side gates H1 and H2, and swinging them from open position where they parallel the plane of the bottom 1 of the dump body, into closed or retracted position where they abut the side edges of the front and rear ends 3 and 2, respectively of the dump body.

In FIG. 9, the interior of the hollow portion of the rear end wall 2 of the dump body H, is shown, and a telescopic hydraulic cylinder L is shown mounted in this space and being centrally disposed and having its base secured to the top plate 2a of the end wall 2. In fact the rear end plate can be likened to an inverted channel, see FIG. 8, whose sides are spaced apart to receive the telescopic hydraulic cylinder L, and to receive the end quadrant-shaped plates J2 and K2. The outer end of the telescopic hydraulic cylinder L carries a pulley 8, and a cable 9 is passed around this pulley and has its ends connected to the quadrant-shaped end plates J2 and K2, see FIG. 7, where the cable end is attached to a hook 10 that in turn is welded to the quadrant-shaped end K2. The cable 9 is passed over idler pulleys 11 and has its other end attached to a hook 12 which in turn is welded to the quadrant-shaped end plate J2, see FIG. 9. FIG. 8 is an enlarged section through one of the idler pulleys 11 and shows how it is mounted in the space between the two sides of the rear end 2 for the dump body H. The arc-shaped edges of the swingable end plates J2 and K2 are provided with cable-receiving grooves 13 for receiving the cable 9, see FIGS. 7, 8, 9 and 11. The side gate H1 is shown in open position in FIG. 9 while the side gate K2 is shown closed. In FIG. 3, the telescopic hydraulic cylinder is shown fully extended so as to close both of the side gates H1 and H2. A portion of the rear end 2 for the dump body H is broken away to show the pulley 8 that is carried by the telescopic hydraulic cylinder L. The hydraulic mechanism for operating the quadrant-shaped swingable end plates J1 and K1 is the same as that just described for opening the quadrant-shaped end plates J2 and K2 and like reference characters will be applied to similar parts and no further description of this mechanism will be necessary.

I will now describe the hydraulically actuated means for swinging the side gates H1 and H2 into open position. In FIGS. 2 and 12, I show the side gate H1 for the dump body H provided with a centrally positioned quadrant-shaped center plate M that has one of its straight edges welded to the inner surface of the side gate H1. This plate M is swingably received in a quadrant-shaped housing 14, this housing being welded to the bottom 1 of the dump body H. FIG. 12 shows a portion of the intermediate frame E pivotally supporting at 15 a telescopic hydraulic cylinder N, this cylinder having its outer telescopic end pivotally connected at 16 to the center quadrant plate M. The telescopic cylinder N is used for swinging the quadrant plate M and the side gate H1 into open position, as shown by the dot-dash lines in FIG. 12. The other side gate H2 is likewise provided with a quadrant-shaped plate, see FIG. 2, and similar to the plate M, and given the same character M. A telescopic hydraulic cylinder, not shown, is operatively connected to the quadrant plate M that swings the side gate H2 into open position. The two telescopic hydraulic cylinders N are schematically shown in FIG. 1.

Figure 14:
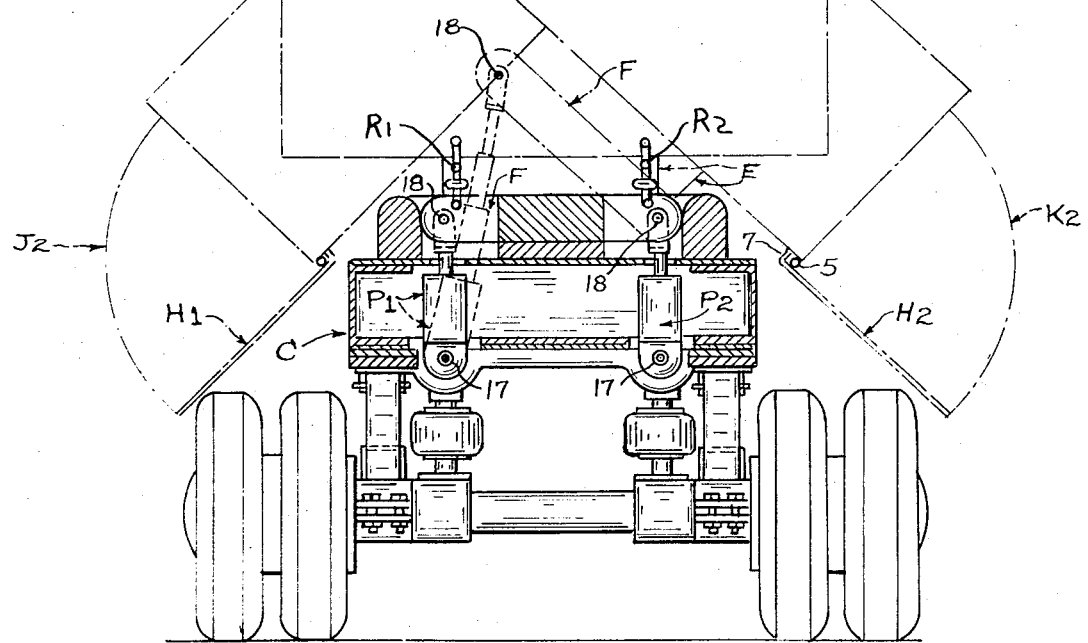
FIG. 14 is a transverse section through the rear hydraulic mechanism used for tilting the dump body laterally and is taken substantially along the line 14—14 of FIG. 1. Portions of FIG. 14 are shown in elevation.
Figure 15:
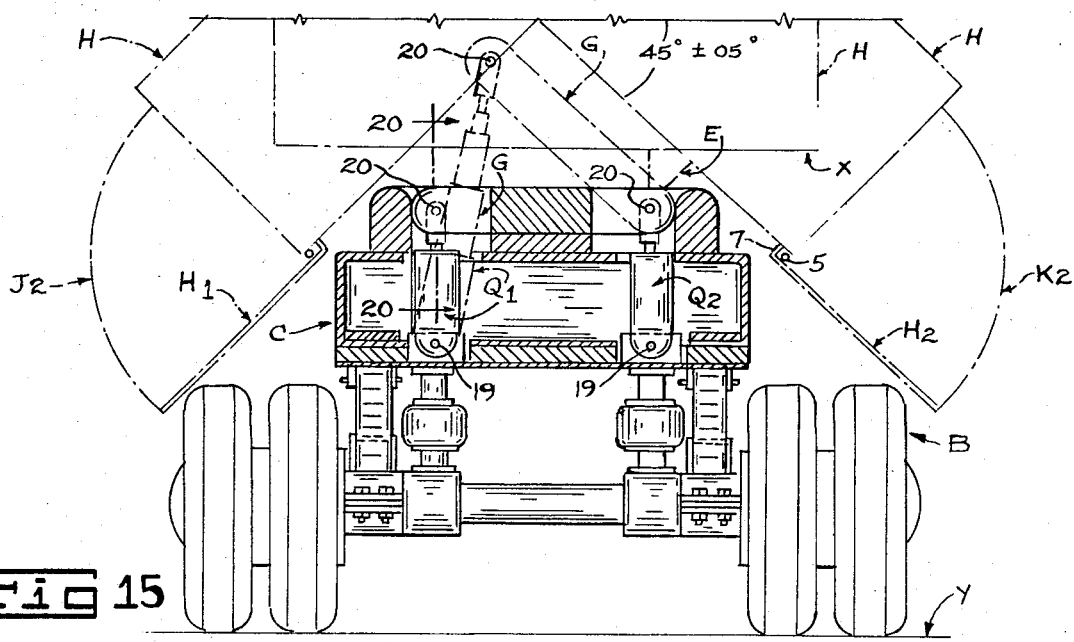
FIG. 15 is a transverse section through the front hydraulic mechanism used for tilting the dump body laterally and is taken substantially along the line 15—15 of FIG. 1, and shows portions of the device in elevation.

I will now describe how the dump body H is tilted laterally in either direction from its horizontal position. In FIGS. 14 and 15, I show the hydraulic mechanism for tilting the dump body laterally. The main frame C pivotally supports a rear pair of telescopic cylinders P1 and P2 at 17, see FIG. 14, and the extensible ends of the cylinders are pivotally connected at 18 to opposite ends of the rear bolster F. In like manner the main frame C pivotally supports a front pair of telescopic cylinders Q1 and Q2 at 19, see FIG. 15, and the extensible ends of the cylinders are pivotally connected at 20 to opposite ends of the front bolster G. The two bolsters F and G, are connected to the intermediate frame E and support it. The intermediate frame E supports the dump body H, and can tilt it laterally in either direction when the bolsters F and G are swung into an inclined position by the telescopic hydraulic cylinders P1 and Q1 or P2 and Q2.

Figures 18, 19, 20:
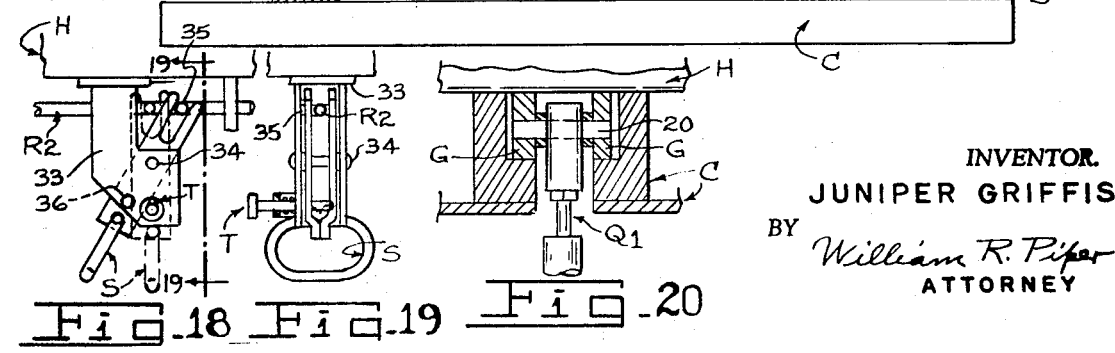
FIG. 18 is an enlargement of the dot-dash circled area of FIG. 16 and shows the manually actuated lever for the quadrant and bolster locking mechanism, in locked position by full lines and in unlocked position by dot-dash lines.
FIG. 19 is a transverse section taken along the line 19—19 of FIG. 18 and illustrates the manually actuated lever with its handle and further shows a spring-biased pin for securing the lever against accidental movement when the quadrant and bolster locking pins are in locked position. The spring-biased pin can also secure the lever against accidental movement when the quadrant and bolster locking pins are in unlocked or released position.
FIG. 20 is a longitudinal section through a portion of the device and is taken along the line 20—20 of FIG. 15. This section illustrates how the telescopic cylinder for tilting the rocking bolster is connected to the bolster.

Both FIGS. 14 and 15 show the telescopic cylinders P1 and Q1 extended by the dot-dash lines so as to tilt the dump body H to the right in these Figures when looking from the rear of the device. The horizontal position and the tilted position of the dump body to the left in these same two Figures are also shown by dot-dash lines. The tilting angle is not greater than 45° from the vertical so that the device will have no tendency to roll over either to the right or to the left due to the shifting of the center of gravity. When the dump body H is tilted laterally to the right, then the right hand side gate H2 will also swing into open position. Also, when the dump body H is tilted laterally to the left, then the left hand side gate H1 will be swung into open position. FIG. 20 shows a section through the connection of the telescopic cylinder Q1 with the front bolster G shown in FIG. 15.

Figure 16:
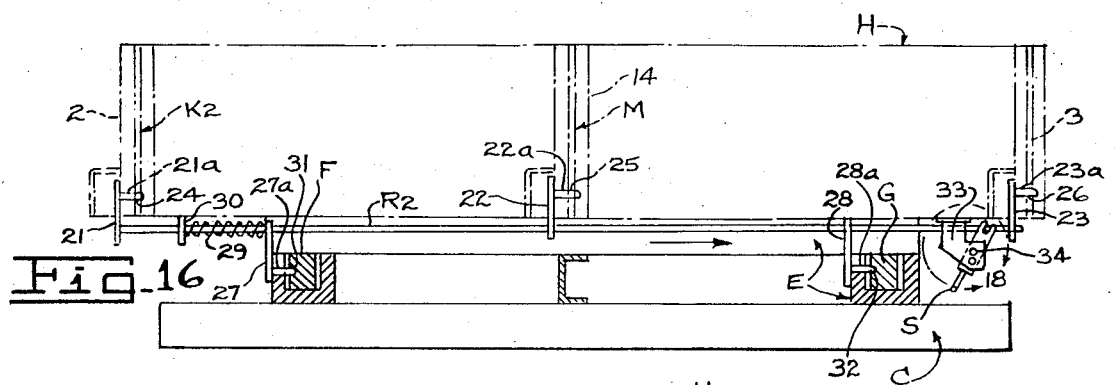
FIG. 16 is a longitudinal section through one of the quadrant and bolster locking mechanisms and is taken substantially along the line 16—16 of FIG. 3. The quadrant and bolster locking pins are shown in locked position in this Figure. The dump body is shown by dot-dash lines.

Before describing the operation of the device it is best to set forth the novel locking mechanism for preventing the dump body H from tilting laterally accidentally and for preventing the side gates H1 and H2 from swinging accidentally into open position. FIG. 16 is a longitudinal section taken along the line 16—16 of FIG. 3 and shows the locking mechanism in operative position. A pair of rods R1 and R2, see FIGS. 3, 14 and 15, extend longitudinally throughout substantially the length of the dump body H and are slidably mounted in the intermediate frame E. The rod R2 is shown in FIGS. 16 to 19, inclusive and a description of the parts associated with the rod R2 will suffice for both rods because both rods R1 and R2 carry the same parts.

Figure 17:
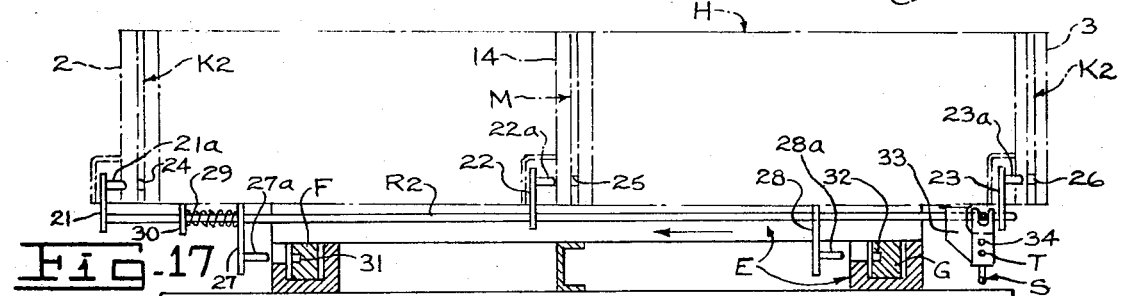
FIG. 17 is a longitudinal section similar to FIG. 16, but shows the quadrant and bolster locking pins in unlocked or released position. The dump body is shown by dot-dash lines.

The slidable rods R1 and R2 carry upstanding fingers 21, 22 and 23 that are provided with locking pins 21a, 22a and 23a, see FIGS. 16 and 17. In FIG. 16, the locking pin 21a for the spring-biased rod R2 has entered an opening 24 in the quadrant-shaped rear end plate K2 and will hold this plate from accidentally swinging to prevent its associate side gate H2 from swinging into open position. Also the pin 22a has entered an opening 25 in the central quadrant M that is attached to the side gate H2, and the pin 23a has entered an opening 26 in the quadrant-shaped front end plate K2. These three locking pins 21a, 22a and 23a will prevent the accidental swinging of the side gate H2 into open position. The same is true for the rod R1 and its locking pins which prevent the side gate H1 from accidentally swinging into open position.

FIGS. 16 and 17 show the rod R2 as carrying downwardly depending fingers 27 and 28 that support locking pins 27a and 28a. A coil spring 29 is mounted on each rod R1 and R2 and one end of the spring bears against a bracket 30 that is carried by the underside of the dump body H, and slidably supports the rod R2.

The spring 29 yieldingly urges the rods R1 and R2 to the right in FIGS. 16 and 17, which will move the locking pins 27a and 28a into locking position in FIG. 16. These locking pins 27a and 28a will enter recesses 31 and 32 in the rockable bolsters F and G, respectively. In FIG. 17 the locking pins 27a and 28a are shown in unlocked or released position.

I show a manually actuated lever S in FIGS. 3 and 16 to 19 inclusive for moving the rods R1 and R2 into released position. A bracket 33 is connected to the underside of the dump body H and the lever S is pivotally secured to it at 34. The lever S is formed of two parts, see FIG. 19, that straddle the rod R2, and the upper ends of these parts are bifurcated so as to receive a transversely extending pin 35, carried by the rod, see FIG. 18. The lever S has a handle at its lower end. FIG. 18 shows the lever S rotated clockwise in full lines to move the rod R2 to the right in FIG. 16 and cause the locking pins 21a, 22a and 23a to secure the side gates H1 and H2 from accidentally swinging into open position. Also the locking pins 27a and 28a are moved into locking position to prevent the bolsters F and G from tilting the dump body H laterally. A spring-biased locking pin T, see FIGS. 18 and 19, can hold the lever S in this position. The lever S can be swung counterclockwise from the full line position shown in FIG. 18 into the dot-dash line position, and this will move the rod R2 to the left in FIG. 17 to free the locking pins. The spring-biased locking pin T is manually retracted to to permit the lever S to be swung and then when the lever is in the dot-dash line position of FIG. 18, the pin T can be released and it will enter an opening 36 in the lever that has been brought into registration with the pin T, see also FIG. 17. Any type of lever S may be used and the lever is preferably positioned at the forward end 3 of the dump body H, see FIGS. 16 and 17. There will be two spring-biased rods R1 and R2, each operating its own series of locking pins 21a, 22a, 23a, 27a and 28a, and each rod will be actuated by its own lever S.

OPERATION

From the foregoing description of the various parts of the device, the operation thereof will be readily understood. In FIG. 1, I illustrate schematically how the various hydraulic cylinders are operatively interconnected so that only three controls are necessary to effect the laterally tilting of the dump body H, in either direction and the lateral swinging of either side gate H1 or H2 into open and closed position.

The truck A, in FIG. 1, has an instrument panel 37 and a pair of two-way hydraulic controls 38 and 39 are mounted in the panel. A fluid supply tank is shown at U and the fluid pump is not shown. A hydraulic line, indicated by the double dash line 40, extends from the two-way control 39 to the supply tank U and then the line 40 leads from the tank to the telescopic hydraulic cylinders P1 and Q1 that are used for tilting the bolsters F and G to the right in FIGS. 14 and 15. The left hand rod R1 has already been actuated by its lever S to release the locking pins 27a and 28a from the bolsters so that the bolsters F and G can be tilted to the right in FIGS. 14 and 15. The rod R2 has not released its locking pins and, therefore, the bolsters F and G will swing about the pivots 18 and 20 that connect the same bolsters to the other telescopic hydraulic cylinders P2 and Q2. The fluid pump, not shown, causes this operation to take place by forcing fluid into the telescopic cylinders P1 and Q1.

When the dump body H has been tilted to the right in FIGS. 14 and 15 to the desired angle which should not be more than 45°, the two-way control 39 is actuated to stop any further flow of fluid into the lines 40 and to the telescopic cylinders P1 and Q1. Then the operator actuates the rod R2 for freeing the locking pins 21a, 22a, and 23a from the openings 24 and 26 in the end plates K2 and K1, respectively, and from the opening 25 in the center plate M. The two-way control 38 is actuated and fluid will flow through the hydraulic line 41, indicated by the single dash line to the tank U and on to the central telescopic cylinder N in FIG. 1, that is associated with the right hand center plate M that is attached to the side gate H2 and shown by the dotted lines in FIG. 2. The fluid pump, not shown, will deliver fluid to the telescopic cylinder N and cause the right hand center plate M to swing the side gate H2 into open position as indicated in both FIGS. 14 and 15. During this swinging of the side gate, the end plates K2 and K1 will also be swung and the liquid in the extended telescopic hydraulic cylinders L will be free to flow back into the supply tank U as the swinging end plates pull on their cables 9 and cause the telescopic cylinders L to collapse. FIGS. 14 and 15 illustrate how the side gate H2, when swung into open position, has its plane substantially paralleling the plane of the bottom 1 of the dump body H. The flange 7 on the side gate H2 will abut the underside of the dump body and aid in supporting the gate.

After the dumping operation, the side gate H2 is returned to closed position by the operator actuating another two way control switch 42 and causing fluid to flow through hydraulic lines 43 to the telescopic cylinders L so as to extend these cylinders and move their pulleys 8 and pulling on the cables 9 for closing the side gate H2. Then the two way control 39 is actuated for permitting the fluid in the telescopic cylinders P1 and Q1 to collapse to normal position and permit the bolsters F and G, and the dump body H to return to normal position. The manual levers S are then swung to move the rods R1 and R2 into a position where the locking pins 21a, 22a and 23a will secure the side gate H2 in closed position and where the locking pins 27a and 28a will secure the bolsters F and G in normal position.

It is unnecessary to describe the operation for causing the dump body H to tilt laterally to the left in FIGS. 14 and 15 nor describe how the side gate H1 is swung into open position since these operations are similar to those just described for swinging the dump body to the right in the same two Figures. The hinges 4 and 5 for the side gates H1 and H2 of the dump body are preferably of the piano type hinge, although any type may be used. FIG. 7 illustrates the cable 9 as being provided with a turnbuckle 44 so as to be able to take up any slack in the cable.

When the dump body H is of a great length, the central quadrant-shaped housings 14 are used to provide greater strength because the hydraulically operated side gates H1 and H2 are very heavy. Some side gates may be corrugated for greater strength and such side gates could have a thickness of 3 or 4 inches. The grooves 13 in the arcuate portions of the end plates K2 and K1 will center the cable 9 during the swinging operation of the side gates H1 and H2. The main purpose for the manually controlled locking means for the bolsters F and G and for the side gates H1 and H2 is to prevent the accidental lateral tilting of the dump body H, and the accidental swinging of the side gates into open position while the device is in transit. The rocking bolsters F and G have rounded ends and these rounded ends permit a cam type or rocking action as the bolsters have either their left or right hand ends elevated by the telescopic cylinders P1 and Q1 or P2 and Q2.

In FIG. 15, I indicate the bottom of the dump body H when in normal horizontal position by the letter X and I indicate the ground at Y. The distance between these two points is very high on this type of vehicle, the reason being that extra height is needed due to the tilting of the dump body laterally and to keep the dump body clear of the wheels B, thus permitting the hydraulic systems to operate more effectively. With the exception of the heavy steel support system under the hydraulic telescopic cylinders P1, P2, Q1 and Q2, all of the tractor and trailer details are conventional. It is hardly probable that both of the side gates H1 and H2 of the dump body H would be swung into open position at the same time. This could be done if the telescopic cylinders L had a longer movement between retracted and extended positions. On off the road condition, such a wider container bed could be used, for example, in a hay field. If the lateral tilting of the dump body H is held to not more than a 45° angle, the center of gravity for the vehicle is not violated and it will not tip over.

The dump body H, in FIG. 17, is shown by dot-dash lines and the rear end 2 with its housing for the locking finger 21 and the locking pin 21a are likewise shown by dot-dash lines. For the purpose of greater clarity an enlarged sectional view of a portion of the rear end 2 of the dump body H is illustrated. The locking pin 21a is shown released from the opening 24 in the rear quadrant plate K2, and the housing for the locking pin 21a and the supporting finger 21 is shown in section.

I claim:

1. A vehicle having a frame
   a. a dump body mounted on said frame and having a bottom;
   b. a left and a right side gate hingedly connected to the two side edges of the dump body bottom;
   c. means for tilting said dump body laterally either to the right or to the left so as to incline the dump body bottom from a horizontal position;
   d. means for swinging the left side gate into open position when said dump body is tilted laterally to the left, and for swinging the right side gate into open position when said dump body is tilted laterally to the right;
   e. said means for swinging the two side gates into open position including two quadrant-shaped plates, one for each side gate, one straight edge of each plate being secured to the inner surface and substantially at the middle of each side gate, said plates extending inwardly from said gates when the latter are in closed position; and
   f. hydraulically controlled means for swinging either plate for closing the side gate associated with said plate to swing into an open position substantially paralleling the plane of said dump body.

2. The combination as set forth in claim 1 and in which
   a. said dump body has front and rear ends against which said side gates contact when they are in closed position, said ends having hollow interiors;
   b. hydraulic means mounted in the hollow interiors of said front and rear ends for swinging said side gates into closed position and including a quadrant-shaped end plate secured to each end of each side gate and being slidably receivable in the hollow interiors of the front and rear dump body ends;
   c. a hydraulic telescopic extensible cylinder centrally mounted in the hollow interior of each front and rear ends and carrying a pulley that is moved by the changing length of the extensible cylinder; and
   d. a separate cable for each of the front and rear ends, each cable having its mid-portion contacted by the pulley that is moved by the extensible cylinder, the ends of the cable being connected to the two quadrant-shaped end plates that are received in the hollow interiors of the front and rear ends, the actual connection of the cable ends to the two end plates being made where the ends of the arcuate-shaped edges of said end plates meet the adjacent surface of the associate side gate, the arcuate-shaped edges of said end plates being provided with a cable receiving groove, and the length of each cable being such that when said telescopic cylinder is fully extended, it will pull on said cable for causing it to swing the side gates into closed position.

3. The combination as set forth in claim 2: and in which
   a. means is provided for securing said quadrant-shaped end plates in closed position for preventing the accidental swinging of the side gates into open position.

4. The combination as set forth in claim 3: and in which
   a. the securing means for holding the quadrant-shaped end plates in closed position also includes means for preventing the accidental swinging of the quadrant-shaped plates that are connected substantially at the middle of each side gate;
   b. whereby said securing means must initially be moved into released position for freeing the middle and end quadrant-shaped plates before the desired side gate can be swung into open position.

* * * * *